United States Patent [19]

Kwang-Chien

[11] Patent Number: 5,150,106
[45] Date of Patent: Sep. 22, 1992

[54] POINTING DEVICE FOR RAPID MOVING CONTROL OF A CURSOR ON A SINGLE AXIS

[76] Inventor: Fong Kwang-Chien, 5F, No. 3, Lane 359, Chung Shan Rd., Sec. 2, Chung Ho City, Taipei Hsien, Taiwan

[21] Appl. No.: 674,300

[22] Filed: Mar. 25, 1991

Related U.S. Application Data

[63] Continuation of Ser. No. 315,743, Feb. 27, 1989, abandoned.

[51] Int. Cl.⁵ .............................. G09G 3/02
[52] U.S. Cl. ................... 340/709; 340/706
[58] Field of Search ........ 340/709, 706, 710

[56] References Cited

U.S. PATENT DOCUMENTS 4,782,335 11/1988 Gussin .................. 340/709
4,818,978 4/1989 Kurihara et al. ............. 340/706

FOREIGN PATENT DOCUMENTS

WO82/3712 10/1982 PCT Int'l Appl. .......... 340/709

OTHER PUBLICATIONS

"Bimodal Mouse", IBM Technical Disclosure Bulletin, vol. 29, No. 1, Jun. 1986, pp. 421–422.
Bennett et al., "Cursor Movement Control Circuitry", IBM Technical Disclosure Bulletin, vol. 21, No. 3 Aug. 1978, pp. 1184–1186.

Primary Examiner—Ulysses Weldon
Assistant Examiner—Amare Mengistu
Attorney, Agent, or Firm—Lowe, Price, LeBlanc & Becker

[57] ABSTRACT

A pointing device for rapid moving control of a cursor on a single axis, including an axis X inhibit key and an axis Y inhibit key to respectively control a specific pin of one of the input/output ports of the associated CPU to match with software program such that when one inhibit key is pressed the amount of movement of the pointing device on one axis is cleared to allow the cursor move along the direction of the other axis.

8 Claims, 4 Drawing Sheets

```
CHECK-INH

SEEIF-X    IN    A, P2
           ANL   A, #00000001B   ; CHECK P20 STATE
           JNZ   SEEIF Y         ;
           MOV   RO,#X COUNT     ; CLEAR THE CONTENT OF X COUNT
           CLR   A
           MOV   @ RO,A

SEEIF-Y    IN    A, P2
           ANL   A, #00000010B   ; CHECK P21 STATE
           JNZ   NORMAL 1        ;
           MOV   RO,#Y COUNT     ; CLEAR THE CONTENT OF Y COUNT
           CLR   A
           MOV   @ RO,A

NORMAL-1   :
           :
           :
           :
           :
```

FIG.4

POINTING DEVICE FOR RAPID MOVING CONTROL OF A CURSOR ON A SINGLE AXIS

This application is a continuation of application Ser. No. 07/315,743 filed Feb. 27, 1989 now abandoned.

BACKGROUND OF THE INVENTION

This invention relates to a pointing device for rapid movement control of a visible cursor on a single axis on a display screen and, more particularly to a pointing device which includes two additional inhibit control keys for use with an interactive display oriented computer system to respectively clear the displacement signal on the axis X or the axis Y so as to let the visible cursor rapidly complete the movement on the other free axis.

Regular pointing devices, such as optical mouses or digitizers, are for use with computer system to provide movement for a visible cursor from position to position on a display screen of such a system.

In spplication, it is rather difficult by means of regular point devices to draw a straight line along the axis X or the axis Y or to draw an axial line. If to drive the mouse with a hand to draw a line directly, it will take much time to complete, and because the hand may be not very stable, the position deviation may exist. In this case, the common method is to stop hand driving and to use a special function key on the mouse for coordinate positioning at a preselected target point and then to press on another functional key to connect the line. According to this method, one should have to operate one and more function keys while the original function is temporarily stopped. Further, it is not very easy to set a target point on a coordinate. If any error in setting of target point, the deviation of line should be eliminated and the process should be repeated again. It is also very difficult to find the original initiation position when to return to hand drawing function.

In order to solve the said problems, the present invention provides special function key with the mouse to control quick movement of the visible cursor along a single axis on a display screen. For example, under a hand drawing function, when to drive a cursor to move along vertical direction (axis Y), it is simply to press on an inhibit key of INH-Y to allow the cursor be driven to rapidly move upward or downward (axis Y). If the moving track of the mouse is inclined or becomes tortuous due to vibration of the hand or control error, because all horizontal deviation (axis X) of the mouse will be cleared by the microprocessor during the operation and only the vertical (axis Y) displacement signal is set to the main processor, when the computer receives any signal, it will determine that the mouse is exclusively for vertical (axis Y) displacement, and the cursor will be accurately driven to move along vertical (axis Y) direction.

SUMMARY OF THE INVENTION

The present invention is to provide a pointing device for rapid movement control of a cursor on a single axis, which includes an axis X inhibit key and an axis Y inhibit key to respectively control two input/output pins of the microprocessor so as to clear the variation amount of displacement of the pointing device on the axis X or the axis Y, and to let the variation signal of displacement on the other axis be sent to the main processor to drive the visible cursor for quick moving along single axis on the monitor.

BRIEF DESCRIPTION OF THE DRAWINGS

FIG. 4 illustrates the assembly language of the present invention.

DETAILED DESCRIPTION OF THE PREFERRED EMBODIMENTS

Referring to the system flow chart of regular pointing device (optical mouse). When power is set (switched on), the system is initiated and the clock is started to provide required timing pulse. The primitive transmission speed is set up accordingly. Through the judgment to provide high or low potential output, the system enters the read-in function key state (hand drawing or pointing coordinate function etc.), to change the function code. The next process is to read-in the position assembly state of the mouse on the axes X and Y. The assembly state of the axes X and Y varies with the methods applied by system manufacturers. For example, in optical input process, there are coordinate variation input method, matrix comparison input method, etc. Although there are numerous reading method for the X and Y position assembly, after passing through through software arrangement and microprocessor processing, it will obtain the same result, that is, the change of the direction and amount of movement of the cursor on the axes X, Y is discomposed into X and Y direction displacement signals and transmitted to the main processor. The present invention is to clear the direction displacement signal for the axis to be inhibited letting the direction displacement signal for the other axis be transmitted to the main processor for driving the movement of the cursor. The flow chart of the present invention is to be set between Point A and B in the flow chart of FIG. 1.

Figure 1:
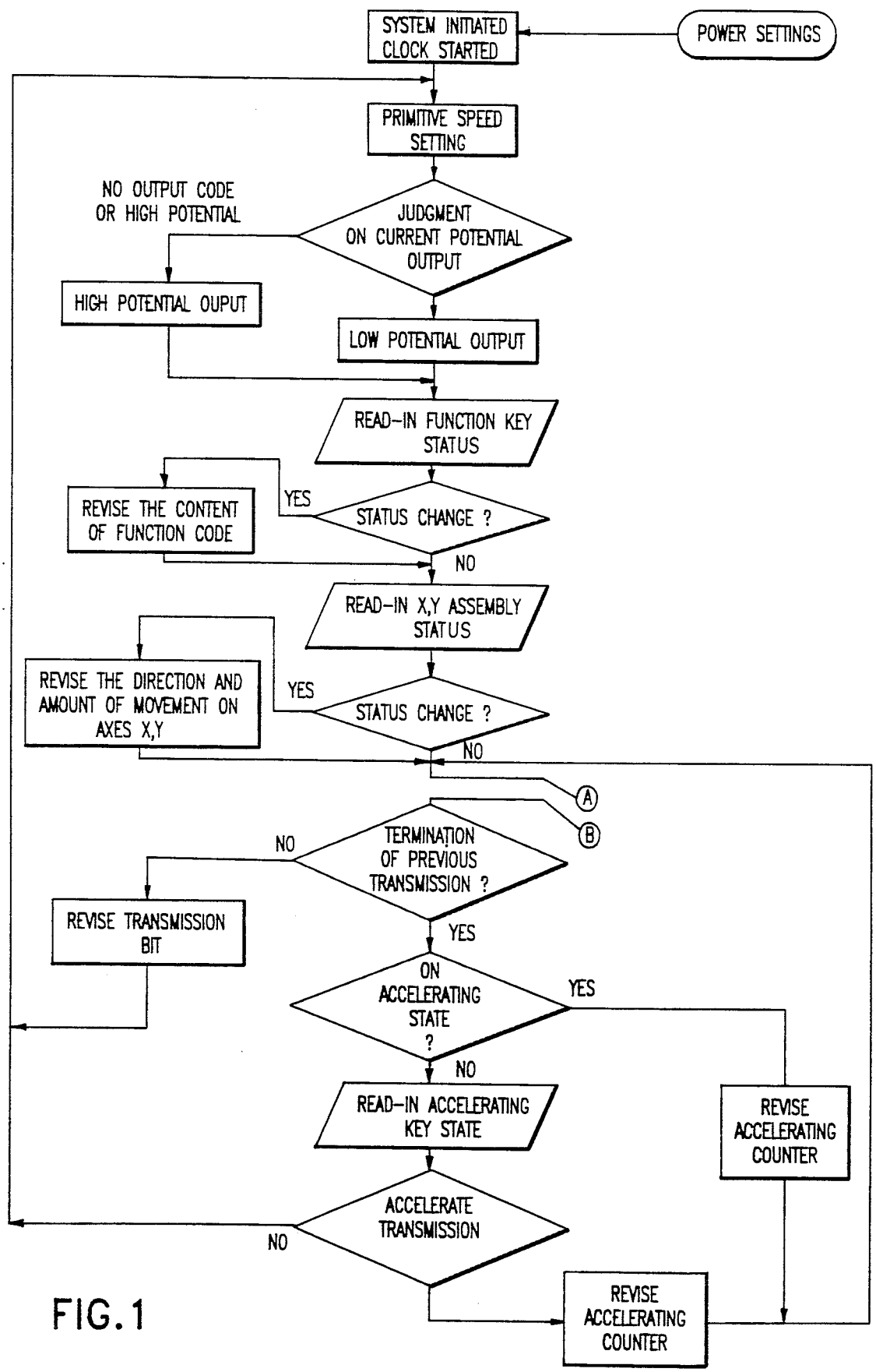
FIG. 1 is a regular flow chart.
Figure 2:
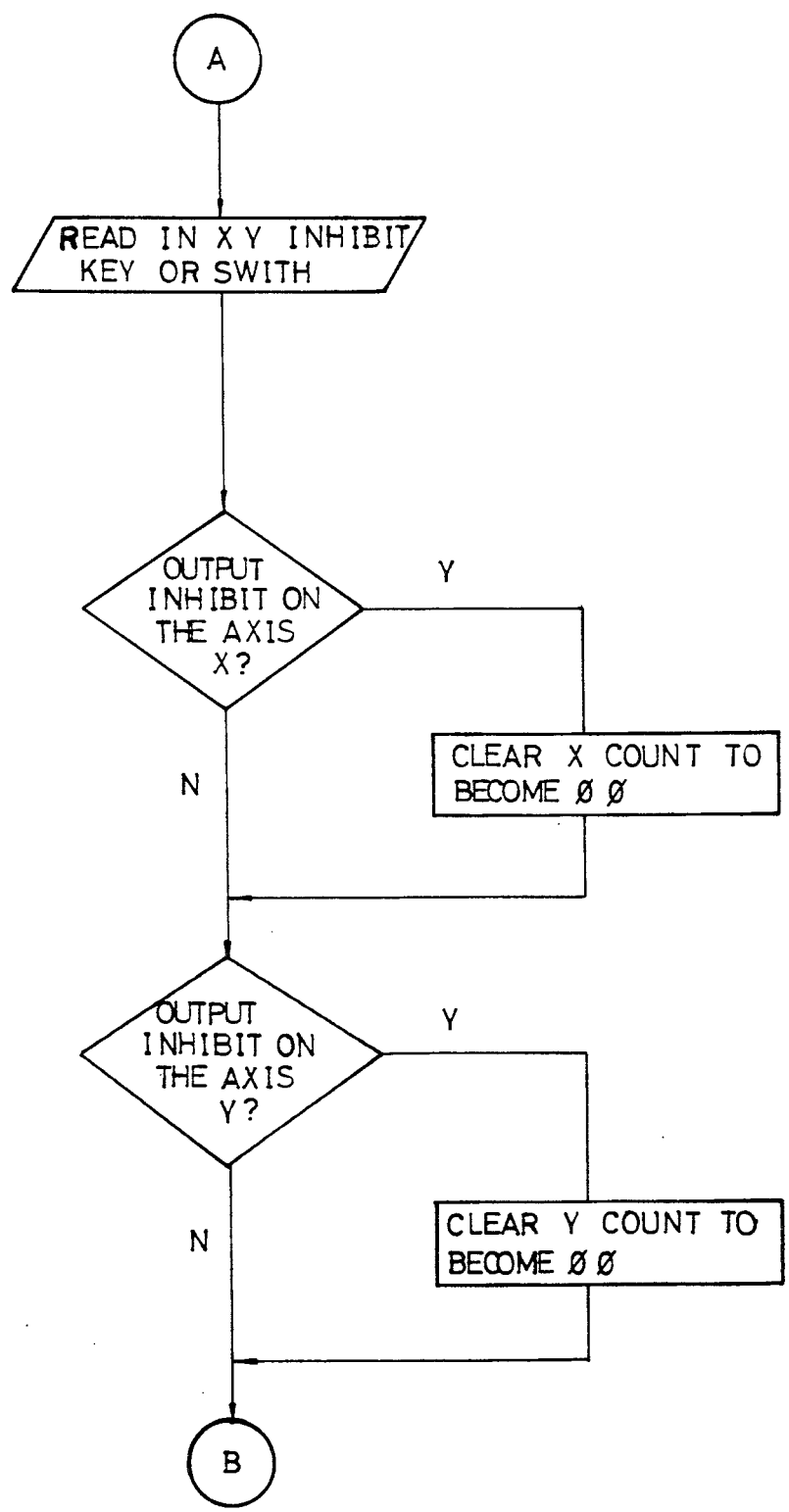
FIG. 2 is a modified flow chart of the present invention.

Referring to the flow chart of the present invention as shown in FIG. 2, the initial and the end of the flow chart are respectively connected to the flow chart of FIG. 1.

Figure 3:
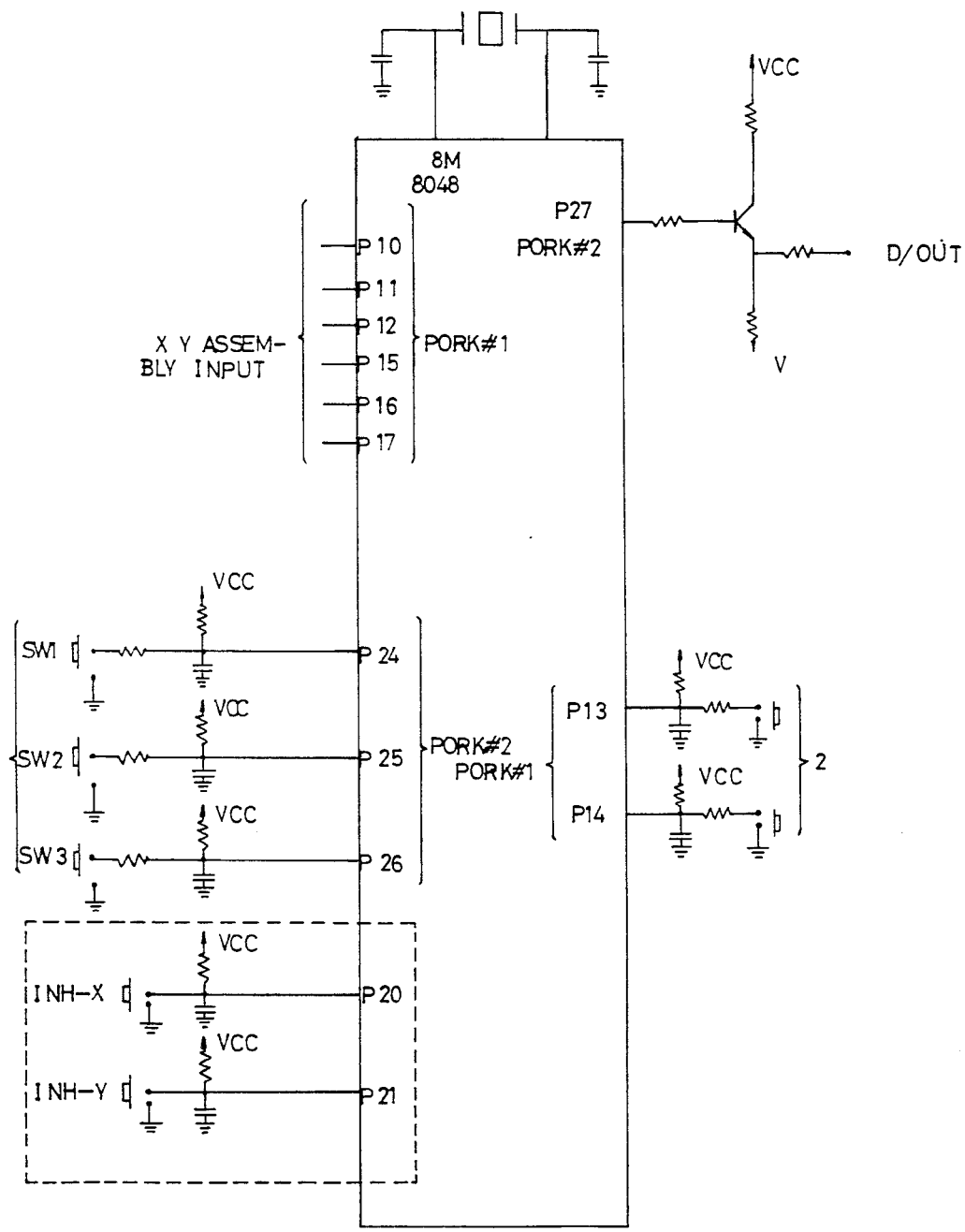
FIG. 3 is a circuit diagram of the present invention.

Referring to the circuit diagram of the present invention as shown in FIG. 3, in the present embodiment, a 8048 microprocessor is used as the control center for the mouse. Except the additional axis X inhibit key (INH-X) and axis Y inhibit key (INH-Y), the mouse has a structure same as the prior art. The pins P10 to P18 of the I/O Port #1 of the CPU 8048 are for receiving the assembly signal of the mouse on X, Y position. The signal source may vary with the system used, as previously described. The pin P27 of the Port #2 is to transmit to the main processor the X and Y direction displacement signal obtained from the micro processor. The three switches SW1, SW2, and SW3 are the same as the prior art and not the scope of the present invention. The additional keys of INH-X and INH-Y are to respectively control the pins P20 and P21 of the Port #2 of the CPU 8048.

Please refer to the assembly language applied in the present invention as shown in FIG. 4, matching with the flow chart of FIG. 2. When CPU 8048 reads in the assembly state of the mouse on the axes X and Y and obtained the amount of movement on X and Y direction (FIG. 1), it enters the flow chart to judge if under inhibit state.

| | |
|---|---|
| CHECK - INH | |
| SEE IF - X IN A,P2 | To judge if the amount changed on X direction is to be inhibited. To read P2 state in the register A. |
| ANL A,#00000001B | to let the content of register A be with the value 00000001 for AND operation. In the present embodiment, INH-X is transmitted to the pin P2O of the CUP (FIG. 3). If the key is pressed on, the signal from P2O is 0, and the value after operation becomes 0000000 (zero); otherwise it becomes 00000001 (not zero). |
| JNE SEE IF - Y | If the axis X is not to be inhibited (the value of the operation is not zero), it skip directly to SEE IF-Y program section. |
| MOV R0,#Xcount | If the axis X is to be inhibited (the value of the operation is zero), it directs to the address of the X count. |
| CLR A | To clear the register A to become 0. |
| MOV @R0,A | To clear the address for X count to 0. |
| SEE IF-Y IN A,P2 | To judge if the amount changed on Y direction is to be inhibited. To pick up the P2 state with the value 00000010 for AND operation. |
| JNE NORMAL-1 | If the resulted from the operation is not zero, the axis Y should not be inhibited, then, it is to skip to normal program section. |
| NOV R0,#Y count | If the result of the operation is zero, it means that the axis Y should be inhibited. Then, the content of the Y count is cleared to become 0, same as the function on axis X inhibit. |
| CLR A | |
| MOV 2R0,A | |
| NORMAL-1 | To continuously execute the normal program |
| : | |
| : | |
| : | |

As per above description, if axis X (or axis Y) is inhibited, its amount varied will be cleared to become $\phi$, therefore, only the amount varied on the axis Y (or the axis X) will be transmitted to the computer to drive the cursor move on Y direction (or X direction).

I claim:

1. A cooridinate-data input device for supplying a cursor control signal, comprising:
   motion detection means for detecting displacement of said input device in first and second orthogonal directions over a surface and, in response, supplying respective first and second displacement signals;
   first manual switch means for supplying a first displacement inhibit command signal;
   second manual switch means for supplying a second displacement inhibit command signals; and
   processor means responsive to said first and second displacement signals and to said first and second inhibit command signals for supplying a cursor control signal indicating displacement data in said first and second directions whereby displacement data in said first and second directions are respectively inhibited in response to said first and second inhibit command signals thereby indicating no displacement in inhibited ones of said directions.

2. The corridinate-data input device in accordance with claim 1, wherein said processor means includes register means responsive to said first and second movement signals for storing said displacement data wherein, responsive to said first and second inhibit signals, said processor means periodically sets a respective portion of said data representing displacement data in said inhibited directions to a predetermined value indicating no movement in the inhibited directions.

3. The coordinate-data input device in accordance with claim 1, wherein said processor means includes register means for storing said displacement data and resetting means repsonsive to said first and second inhibit signals for periodically clearing a respective portion of said register means representing displacement in said inhibited directions thereby indicating no movement in the inhibited directions.

4. The coordinate-data input device in accordance with claim 1, wherein said orthogonal directions are in the X and Y directions and said manual switch means repsectively designate said X and Y directions to be said inhibited directions.

5. A coordinate-data input device for providing displacement data, comprising:
   motion detection means for detecting displacement of said input device in first and second directions over a surface and, in response, supplying first and second displacement signals respectively representing first and second displacment data in said first and second directions;
   first and second manual switch means for supplying respective first and second direction inhibit signals; and
   output means receiving said first and second displacement signals and (i) responsive to said first direction inhibit signal for selectively supplying (a) said first movement data and (b) data representing no displacement in said first direction and (ii) responsive to said second direction inhibit signal for selectively supplying (a) said second displacment data and (b) data representing no displacement is said second direction.

6. The corrdinate-data input device in accordance with claim 5, wherein said output means includes:
   register means for storing said first and second displacement data in respective portions of said register; and
   inhibit means responsive to said first and second direction inhibit signals for periodically setting respective ones of said register means portions to a predetermined value indicating no displacement in inhibited ones of said directions.

7. The coordinate-data input device in accordance with claim 5, wherein said output means includes register means for storing said first and second displacement data in respective portions of said register and inhibit means responsive to said first and second direction inhibit signals for clearing respective portions of said register means thereby indicating no displacement in inhibited ones of said directions.

8. The corrdinate-data input device in accordance with claim 1, wherein said first and second directions are orthogonal.

* * * * *